Sept. 22, 1953 — R. W. GUNDERSEN — 2,652,880
TRACTOR SEAT
Filed Dec. 6, 1950 — 2 Sheets-Sheet 2
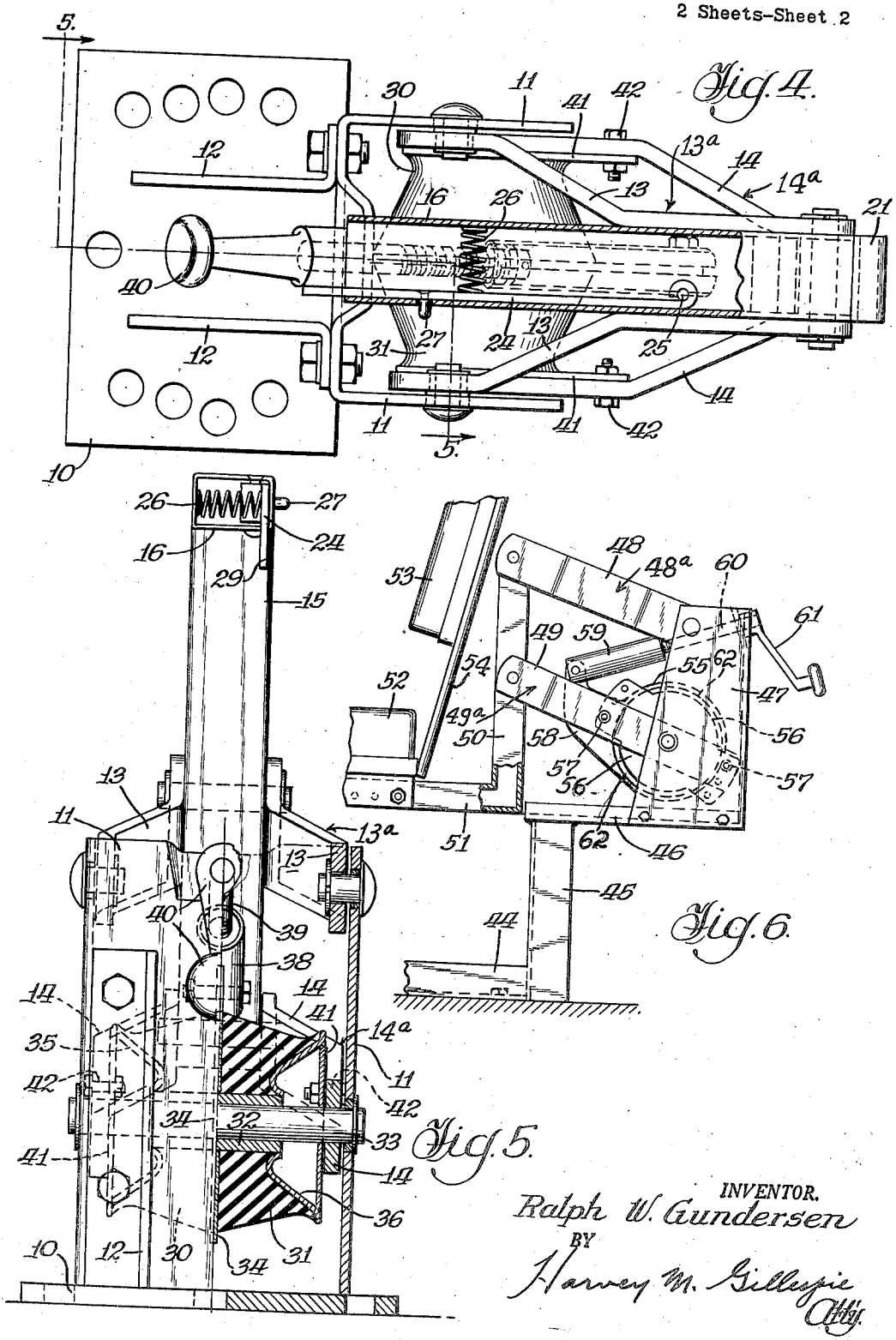
INVENTOR.
Ralph W. Gundersen
BY Harvey M. Gillespie
Atty.

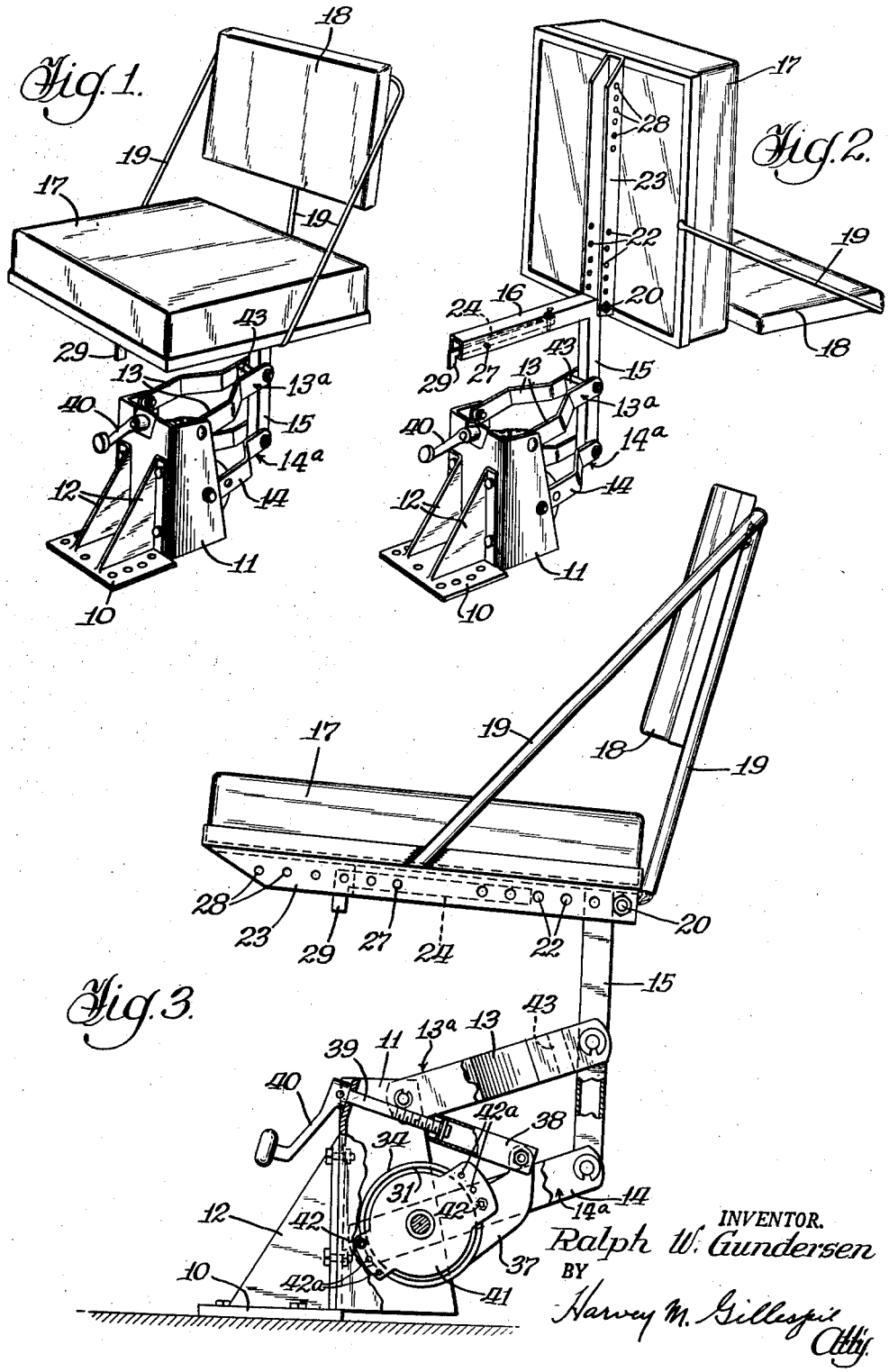

Patented Sept. 22, 1953

2,652,880

UNITED STATES PATENT OFFICE 2,652,880

TRACTOR SEAT

Ralph W. Gundersen, St. Paul, Minn., assignor to Coach & Car Equipment Corporation, Chicago, Ill., a corporation of Illinois Application December 6, 1950, Serial No. 199,519

11 Claims. (Cl. 155—51)

This invention relates to spring seat structures for tractors or similar machines, and it has for its object the provision of an improved structure of this type which will provide smooth riding for the operator and which will support the operator of the tractor at all times within convenient reach of the control mechanisms of the tractor.

A principal object of the invention is to provide an improved arrangement of resilient means and associated parts for supporting a seat always in level position by the use of a strong rugged structure which is not likely to get out of order in long continued use, to make the mechanism readily adjustable for suiting the requirements of operators of different size and weight, to provide that the seat element of the structure may be quickly and easily moved out of operative position so as to permit the operator to work in a standing position to advantage, and to improve devices of this type in sundry details hereinafter pointed out.

A preferred embodiment of the invention is illustrated in the accompanying drawings, in which Fig. 1 is a perspective view of the preferred form of my improved spring seat structure.

Fig. 2 is a view similar to Fig. 1 but showing the seat in changed position for enabling an operator to work conveniently in a standing position.

Fig. 3 is a side view of my improved seat structure on an enlarged scale, with certain of the parts shown in section and other parts broken away for clearness of illustration.

Fig. 4 is a top plan view of the supporting mechanism of the seat, shown partly in section and with the seat member removed.

Fig. 5 is a vertical sectional view taken substantially at the line 5—5 in Fig. 4; and Fig. 6 is a view similar to Fig. 3 but showing a modified form of the supporting mechanism.

Referring now to the several figures of the drawings, in which corresponding parts are indicated by the same reference characters, 10 indicates a base plate designed to be secured to the floor of a tractor directly to the rear of the steering wheel and other control mechanisms of a tractor or the like, having a standard 11 mounted thereon by triangular bracket members 12 rigidly connected with both the plate and the standard. A pivoted arm structure 13a is composed of a pair of laterally spaced links 13—13 connected at their front ends to opposite sides of the standard. A similar pivoted arm structure 14a is composed of laterally spaced links 14—14 which are likewise connected at their front ends to opposite sides of the standard 11, but at a lower level than the arm structure 13a. The lower arm structure 14a is also slightly longer than the upper arm structure as is clearly shown in Fig. 3. The rear ends of both said pivoted arm structures are pivotally connected with a heavy supporting post 15 which is hollow and substantially square in cross-section, being provided at its upper end with a forwardly-extending bar 16 also of hollow form, as is shown in Figs. 2 and 4. The links 13 and 14 of the pivoted arm structures 13a—14a are connected in such arrangement and are of such length that they are positioned in parallel planes with the seat supporting post 15 tipped backwardly to a very slight extent from the perpendicular when the seat 17 mounted thereon is in its uppermost position as shown in Fig. 3.

The seat 17 is of any approved form, having a back member 18 mounted thereon by means of a set of supporting bars 19 of any approved construction and arrangement by which the back 18 is supported rigidly in position with respect to the seat member 17.

The seat member 17 is mounted on the supporting post 15 by means of a heavy pivot-pin 20 extending through a lug 21 carried by the post and through selected ones of a series of openings 22 in the flanges of a channel bar 23 rigidly secured in position on the bottom face of the seat member. The arrangement is such that the seat 17 may be supported in normal level supporting position as shown in Fig. 1 with the channel bar 23 embracing the horizontally-extending bar 16 having a rectangular cross section, as shown in Fig. 3, or in alternative position as shown in Fig. 2 with the channel bar 23 extending upwardly and/or outwardly with respect to the bar 16. The upturned position of the seat, as shown in Fig. 2, is not intended to show the seat in a supported position, but rather to illustrate that the seat may be turned upwardly to permit the operator to assume a standing position. The angular position at which the seat will be supported, when it is turned upwardly relative to the arm 16, will vary with relation to the adjusted position of the seat member lengthwise of the arm 16. For example, if the pivoted bolt is inserted through the end hole 22, the seat may be turned to a substantially inverted position. However, if the seat is adjusted lengthwise of the arm 16 so that the pivoted bolt 20 is inserted through the innermost hole 22, the rear end of the channel bar 23 will move into engagement with the rear face of the post 15 to prevent the seat from being completely inverted. By the provision of a plurality of openings 22 for the pin 20, the seat 17 is made readily adjustable forwardly and backwardly.

Means is provided for releasably latching the channel bar 23 to the bar 16 for holding the seat member 17 releasably in its operative supporting position. This means comprises a flat bar or plate 24 pivotally mounted on a vertically positioned pin 25 in the bar 16 (see Figs. 4 and 5) and normally pressed by a coiled spring 26 into position against the wall of the bar 16 for holding a pin 27 on said bar 24 in position to extend transversely through a suitable opening in the wall of said bar 16 for engagement with one or another of a set of openings 28 in one of the flanges of the channel 23. At its forward end, the bar 24 is provided with a handle portion 29 extending downwardly into convenient position for enabling the operator easily to retract the pin 27 when the seat is to be released for angular movement with respect to the supporting bar 16. The openings 28 in the channel bar 23 are spaced to conform with the openings 22 so that the pin 27 will be adapted to engage one of the openings 28 regardless of which of said openings 22 are occupied by the pivot pin 20.

My improved yielding means for supporting the seat member 17 at the desired level with varying loads thereon comprises two blocks of rubber 30 and 31 which are connected in position between angularly movable parts so as to support the seat by the torsional strength of the blocks. For effecting this result, said blocks 30 and 31 are mounted on a metal sleeve 32 which in turn is carried by a heavy shaft 33 mounted in the standard 11. A metal plate 34 is mounted between said blocks, being strongly bonded to both of the blocks at their inner faces. The outer faces of the blocks are strongly bonded to metal plates 35 and 36, respectively, which are pressed inwardly at their intermediate portions into dished form, with their innermost edge portions, however, reversely bent so as to be tapered outwardly, as shown in Fig. 5. By this arrangement, a comparatively very extensive engaging surface is provided between each block and the outer plate 35 or 36 associated therewith so as to facilitate the formation of an exceedingly strong bond between the plate and the block.

As is clearly shown in Fig. 3, the plate 34 is provided with an arm 37 extending therefrom, pivotally connected with a cylindrical link member 38 which in turn is adjustably connected by screw-threads with a bar link member 39 having a bearing in the front wall of the standard 11 and provided with a crank handle 40 for rotating it for causing the arm 37 to swing in counter-clockwise direction from the position as shown in said Fig. 3. At the outer faces of the blocks 30 and 31, said blocks are provided with plates 41 which are fixedly secured in position with respect to the blocks by being welded to the plates 35 and 36. Each of the plates 41 extends beyond the rubber blocks at opposite faces of the blocks, such extensions being rigidly connected by suitable bolts 42 with the members 14—14 of the pivoted arm 14$^a$, with such bolts mounted in the selected ones of a plurality of openings 42$^a$ in such extensions.

With the inwardly positioned portions of the blocks 30 and 31 held rigidly in position with respect to the standard 11 by the means comprising the plate 34 and the arm 37 thereon, together with their associated parts as shown in Fig. 3, and with the outwardly positioned portions of said blocks connected with the pivoted arm structure 14$^a$, the seat 17 is supported by the torsional strength of said blocks, the arrangement being preferably such that said blocks 30 and 31 are under light torsional tension when the seat member 17 is unoccupied, as shown. For limiting the upward movement of the seat 17 under such conditions, a bar 43 is secured in position by welding or otherwise between the links 13—13 of the arm structure 13$^a$ in position to engage the supporting post 15 so as to prevent the swinging of said arm structure 13$^a$, 13 in counter-clockwise direction with respect to said post in Fig. 3 beyond the position shown in said figure. When an operator desires to be seated, he can very quickly and very easily give the handle 40 a few turns as may be necessary for shortening the effective length of the adjustably connected links 39 and 38 so as to increase very substantially the tension on the blocks 30 and 31. I have found in practice that for operators of different weights, when the parts are properly adjusted so as to provide the required tension, the blocks 30 and 31 of rubber are adapted by their torsional resiliency to provide exceedingly easy riding conditions, regardless of the weight of the operator. The effect is similar whether the operator weighs 70 pounds or 300 pounds. In all cases the seat remains at all times in its level operative position, with a minimum of jouncing or jolting. Moreover, the yielding movement of the seat is within such limits that the operator has no difficulty with respect to remaining at all times in position for enabling him to operate the various foot-levers and other controls within easy reach.

Whenever it may be desired, the operator is able very quickly and easily to release the pin 27 from the engaged opening 28 in the channel member 23 so as to permit the seat to be tipped backwardly out of the way so as to enable the operator to stand without inconvenience for his work.

In Fig. 6, a slightly different arrangement is shown, comprising a base 44 in the form of a channel, having a post 45 rising therefrom for supporting a second channel supporting member 46 in horizontal position a short distance above the floor, a standard 47 being supported from said channel member 46. On this standard, arm structure 48$^a$—49$^a$ composed, respectively, of links 48 and 49 are pivotally mounted, corresponding to the arm structures 13$^a$ and 14$^a$ of the construction first described, such links 48 and 49 extending forwardly for pivotal connection with a tubular structure comprising a post 50 and a horizontally positioned bar member 51, upon which a seat 52 is mounted, with a back 53 connected therewith by means comprising a bar 54. The arms or links 49 are yieldingly connected with the standard 47 by an arrangement similar to that above described in connection with Fig. 5. This connecting and operating means comprises rubber blocks 62 (corresponding to blocks 30—31 of Fig. 5) strongly bonded to an inside plate 55 (corresponding to plate 34 of Fig. 5) and to outside plates 56 (corresponding to plates 41—41 of Fig. 5), such plates 56 being connected by means comprising bolts 57 with the arms 49. The inside plate 55 is provided with an arm 58 extending outwardly therefrom and pivotally connected at its outer end with a link of variable length comprising a cylinder 59 and a rod 60 connected by screw-threads with said cylinder. At its rear end portion, the rod 60 has a rotatable bearing in the upper end portion of the standard 47, with a crank handle 61 mounted on the rod for rotating it so as to adjust the effective length of said link comprising the cylinder and the rod.

Inasmuch as the several parts in the construction in Fig. 6 are generally similar to the corresponding parts in the arrangement first described, it is believed to be unnecessary to describe the same in further detail. By the rotation of the crank 61 and the rod 60, the tension on the blocks 48ª can be regulated to suit the weight of the operator so as to make the seat ride easily and comfortably.

By the use of my invention, I have provided a construction which is very strong and very durable so as to be adapted to stand up for many years under ordinary conditions of use, while at the same time being effectively sensitive to the requirements for avoiding unnecessary jolting so as to provide easy riding and thus conserve the health and strength of the operator.

While I prefer to employ the form of structure as shown and described, my invention is not to be limited thereto, except so far as the same may be specifically claimed, it being understood that changes might well be made in the form and arrangement of the parts without departing from the spirit of the invention.

I claim:

1. A yielding seat structure comprising in combination a standard, two arm structures pivotally mounted on said standard in substantially parallel relationship to each other one above the other, a seat supporting member pivotally mounted on said arm structures so as to be movable upwardly and downwardly with said arm structures, and means connected with one of said arm structures and with said standard adapted by its torsional strength to support said seat supporting member yieldingly in elevated position on said last mentioned arm structure, comprising two rubber blocks bonded to the opposite faces of an interposed plate, means for adjustably connecting said interposed plate in fixed position on said standard for holding the plate and the engaged face portions of the blocks against rotary movement with respect to the standard, and means bonded to the outer faces of said blocks and connected with one of said arm structures for giving said outer face portions of the blocks rotary movements with respect to the standard when said seat member is moved downwardly.

2. A yielding seat structure as specified in claim 1, in which the means for adjustably connecting the interposed plate to the standard includes means for giving said plate a rotary movement with respect to the standard for putting the blocks under tension circumferentially independently of downward movement of said seat member.

3. A yielding seat structure as specified in claim 1, in which means is provided comprising a link of adjustable length for giving said plate a rotary movement with respect to the standard for putting a torsional tension on said blocks independently of downward movement of the seat member.

4. A yielding seat structure as specified in claim 1, in which said blocks of rubber are tapered outwardly away from said interposed plate, and in which the means for connecting the outer face portions of said rubber blocks with said arm comprises metal plates engaging the outer faces of the blocks and dished inwardly for providing increased areas of engagement so as to expedite the formation of a strong bond between the blocks and the plate.

5. A yielding seat structure as specified in claim 4, in which the means for connecting one of said dished plates with said arm comprises a plate extending beyond the rubber blocks at opposite side portions thereof and connected with said one arm at both sides of the axis about which the outer face portions of said blocks are rotatable.

6. A yielding seat structure as specified in claim 1, in which said dished plates are tapered inwardly with reverse bend portions at their inner edges tapered outwardly.

7. A yielding seat structure as specified in claim 1, in which means is provided for limiting the upward movement of said seat member with respect to said standard.

8. A yielding seat structure as specified in claim 1, in which stop means is provided on one of said pivoted arm structures adapted by engagement with the supporting part with which it is pivotally connected to limit the upward movement of said seat member with respect to said standard.

9. A yielding seat structure comprising in combination a standard, two arm structures pivotally mounted on said standard in substantially parallel relationship to each other one above the other, a supporting post pivotally mounted on said arm structures so as to be movable upwardly and downwardly with said arms, means comprising a block of rubber connected with one of said arm structures and adapted by the torsional strength of said block to resist downward swinging movement of said one arm structure, a seat member pivotally mounted on said supporting post, and means for holding said seat member normally in substantially level position on said post and releasable alternatively for permitting the seat member to be turned upwardly and backwardly into a position to permit the operator to stand readily in convenient operating position.

10. A yielding seat structure as specified in claim 9, in which said releasable holding means comprises a pin mounted on a spring pressed bar adapted in its extended position to lock said seat member in its operative position on said supporting post.

11. A yielding seat structure as specified in claim 9, in which said supporting post is provided with a horizontally extending bar portion at its upper end upon which said seat member rests, with a spring-pressed pin extending laterally from said bar portion adapted by engagement with an opening in a flange carried by the seat member to hold the seat member in operative position.

RALPH W. GUNDERSEN.

References Cited in the file of this patent

UNITED STATES PATENTS

| Number | Name | Date |
| --- | --- | --- |
| 1,960,939 | Hansen | May 29, 1934 |
| 2,303,567 | McWhorter | Dec. 1, 1942 |
| 2,460,596 | Roche | Feb. 1, 1949 |